United States Patent
Benjamin

(10) Patent No.: US 9,053,382 B2
(45) Date of Patent: Jun. 9, 2015

(54) ROBUST IMAGE BASED EDGE DETECTION

(71) Applicant: Digital Media Professionals Inc., Musashino-shi, Tokyo (JP)

(72) Inventor: Schmitt Benjamin, Musashino (JP)

(73) Assignee: Digital Media Professionals Inc., Tokyo (JP)

( * ) Notice: Subject to any disclaimer, the term of this patent is extended or adjusted under 35 U.S.C. 154(b) by 170 days.

(21) Appl. No.: 13/848,066

(22) Filed: Mar. 21, 2013

(65) Prior Publication Data
US 2013/0251270 A1    Sep. 26, 2013

Related U.S. Application Data

(60) Provisional application No. 61/613,995, filed on Mar. 22, 2012.

(51) Int. Cl.
*G06K 9/46* (2006.01)
*G06T 7/00* (2006.01)

(52) U.S. Cl.
CPC ............ *G06K 9/4604* (2013.01); *G06T 7/0085* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 2009/0285460 | A1* | 11/2009 | Ishikawa et al. | 382/128 |
| 2010/0195869 | A1* | 8/2010 | Geiss | 382/103 |
| 2010/0289797 | A1* | 11/2010 | Tateno et al. | 345/419 |
| 2013/0251223 | A1* | 9/2013 | Smith et al. | 382/131 |

FOREIGN PATENT DOCUMENTS

WO    WO2008137051 A1    11/2008

OTHER PUBLICATIONS

"Domain and Range of Basic Functions" [online]. analyzemath.com, 2014 [retrieved Nov. 4, 2014 ]. Retrieved from the Internet: <URL: http://http://www.analyzemath.com/DomainRange/domain_rangefunctions.html>, p. 1.*

* cited by examiner

*Primary Examiner* — Bhavesh Mehta
*Assistant Examiner* — David F Dunphy
(74) *Attorney, Agent, or Firm* — Pyprus Pte Ltd

(57) ABSTRACT

The invention relates to a method for detecting an edge of an object in a two dimensional image resulting from rendering a three dimensional object in a three dimensional computer graphic the method detects the edge of the object by means of the Angles of the $PS_{ij}$ vectors in which P is a point at a first pixel in a screen and $S_{ij}$ are neighboring points that neighboring to the first pixel.

9 Claims, 17 Drawing Sheets

Fig. 9

Function GetPsyValues(P,SIJ)
Input:
    P: Current point position in 3D space
    SIJ: Current neighbor position in 3D space
Output:
    PsyR, PsyV, PsyD
    Constant: BiasR, BiasV, R
Calculation:
    PS = P-S
    $D2 = \sqrt{(PS.x)^2 + (PS.y)^2 + (PS.z)^2}$
    PS = PS/D2

PsyR = PS.z + BiasR
    PsyV = -PS.z + BiasV
    PsyD = (D2<R)?PsyR:0;
Endof Function

Function GetEdge(int I, int J)
Input:
    I,J: Current position in 2D space (for accessing framebuffer/position buffer)
Output:
    EdgeRVD: edge value corresponding to PsyR,PsyV and PsyD, i.e. concave, convex and discontinuous concave edge.
Calculation:
    P = readPositionBuffer(I,J)
    S00 = GetPsyValue( P, readPositionBuffer(I-1,J+1);
    S22 = GetPsyValue( P, readPositionBuffer(I+1,J-1);

S01 = GetPsyValue( P, readPositionBuffer(I+0,J+1);
    S21 = GetPsyValue( P, readPositionBuffer(I+0,J-1);

S02 = GetPsyValue( P, readPositionBuffer(I+1,J+1);
    S20 = GetPsyValue( P, readPositionBuffer(I-1,J-1);

S10 = GetPsyValue( P, readPositionBuffer(I-1,J+0);
    S12 = GetPsyValue( P, readPositionBuffer(I+1,J+0);

T0 = -1 + 0.5*(S00+S22);
    T1 = -1 + 0.5*(S01+S21);
    T2 = -1 + 0.5*(S02+S20);
    T3 = -1 + 0.5*(S10+S12);

EdgeRVD = T0+T1+T2+T3
    //For visualization:
    //Red   = EdgeRVD.x
    //Green = EdgeRVD.y
    //Blue  = EdgeRVD.z
    //Silhouette: Red-Blue

Endof Function

ROBUST IMAGE BASED EDGE DETECTION

RELATED APPLICATIONS

This application claims priority to U.S. provisional application Ser. No. 61/613,995 filed on Mar. 22, 2012, the disclosure of which is herein incorporated in its entirety.

TECHNICAL FIELD

The present invention relates to a method for detecting edges of objects in a two dimensional image resulting from rendering a plurality of three dimensional objects in a three dimensional computer graphic context. The present invention further relates to a computer that can execute the method.

BACKGROUND ART

The pamphlet of WO2008/137051 discloses Sobel edge detector to extract edge in computer graphic image. Sobel edge detector is very simple to implement as it is based on a simple matrix convolution. Nonetheless, the final thresholding of the convolved value required for detecting an edge produces visible artifacts.

SUMMARY OF INVENTION

Technical Problem

It is one object of the present invention to provide a method for detecting edges in computer graphics that can suppress artifacts and a computer that can execute the method.

Solution to Problem

The first aspect of the invention relates to a method for detecting an edge of an object in a two dimensional image resulting from rendering a three dimensional object in a three dimensional computer graphic. The method obtains a first coordinate ($x_P$, $y_P$) and a first depth value ($z_P$) in the three dimensional graphic that correspond to a point (P) at a first pixel in a screen. Next, the method obtains neighboring coordinates ($x_{Sij}$, $y_{Sij}$) and neighboring depth values ($z_{Sij}$) in the three dimensional graphic that corresponds to neighboring points ($S_{ij}$) in the screen. The neighboring points ($S_{ij}$) are pixels neighboring to the first pixel. The subscript "I" is 0, 1 or 2 and the subscript "j" is 0, 1 or 2. Then, the method calculates Angles of $PS_{ij}$ vectors. After that, the method detects the edge of the object by means of the Angles of the $PS_{ij}$ vectors.

Because the method calculates Angles of $PS_{ij}$ vectors and decides whether P is at the edge or not based on the Angles, the method can detect edges in computer graphics correctly with high speed.

The second aspect of the invention is a computer that can execute the method of the invention.

Advantageous Effects of Invention

The present invention can provide a method for detecting edges in computer graphics that can suppress artifacts and a computer that can implement the method.

BRIEF DESCRIPTION OF DRAWINGS

FIG. 9 shows the calculation details.

DESCRIPTION OF EMBODIMENTS

The first aspect of the invention relates to a method for detecting an edge of an object in a two dimensional image resulting from rendering a three dimensional object in a computer graphic. The method may detect a plurality of edges on a plurality of objects in a two dimensional image that are included in one scene and are resulting from rendering a plurality of three dimensional objects in a computer graphic. The term, edge, comprises a geometrical concave or convex edge, a contour or a silhouette.

The method usually detects edges or contours of objects in the two dimensional image which result from rendering a plurality of three dimensional objects in a 3D computer graphic context. The edges detected by the method may be edges of objects and silhouettes or contours of objects in two dimensional scenes. For example a sphere in three dimensional scenes may not have any edge (i.e. geometrical edge). However in corresponding two dimensional scenes the corresponding object of the sphere has edge (i.e. silhouette). The method can detect the edge of the object that corresponds to the sphere in three dimensional scenes. Further the object may be a scene because the scene is defined as a set of objects defined in three dimensional computer graphics. The edge may be generated due to overlap of objects and due to insertion of an object to the other object or objects. The first embodiment of the method has following steps.

Figure 1:
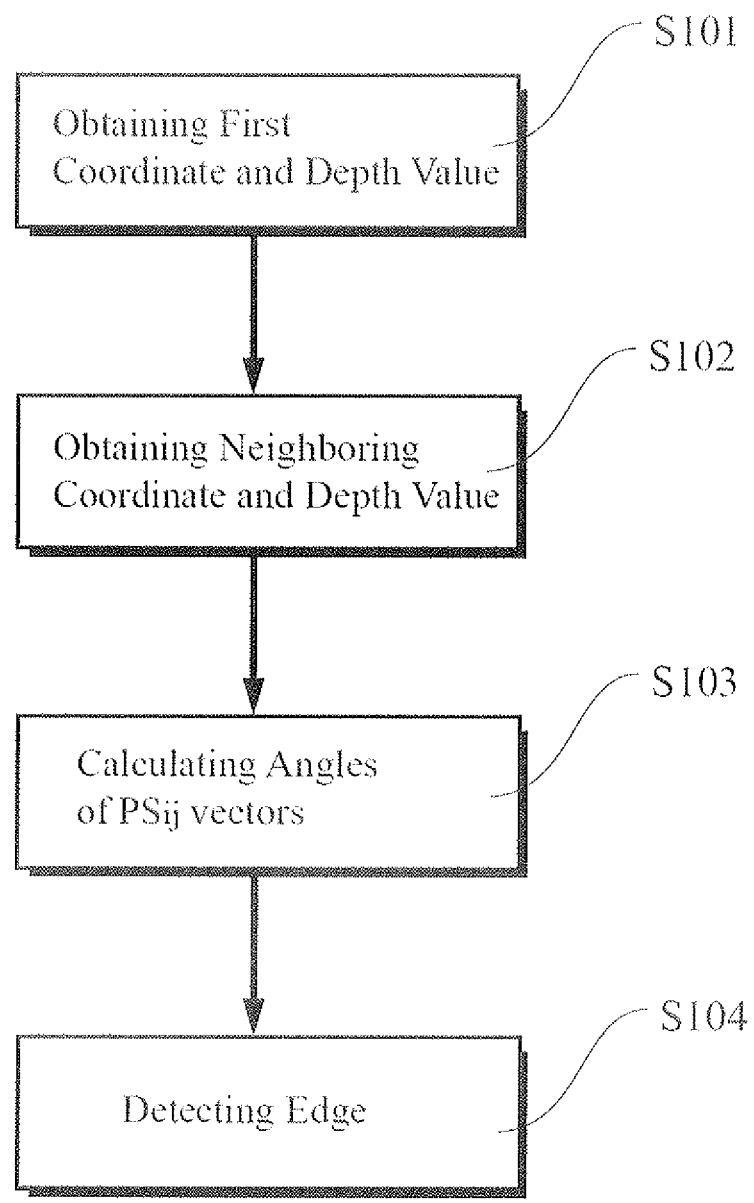
FIG. 1 is a flow chart of the method for detecting an edge of an object.

FIG. 1 is a flow chart of the method for detecting an edge of an object. As shown in FIG. 1, the method has steps of obtaining a first coordinate and a first depth value (Step 101), obtaining neighboring coordinates and neighboring depth values (Step 102), calculating Angles of $PS_{ij}$ vectors (Step 103), and detecting the edge of the object by means of the Angles of the $PS_{ij}$ vectors (Step 104).

In the step of obtaining a first coordinate and a first depth value (Step 101), the method obtains the first coordinate ($x_P$, $y_P$) and the first depth value ($z_P$) in the three dimensional graphic that correspond to the point (P) at the first pixel in a screen. The screen is two dimensional screen that comprises the object and may further comprise other objects. The method basically executes calculation for all of the pixels contained in the two dimensional image. The two dimensional image corresponds to the screen. Because the computer renders the objects in the three dimensional objects, it stores the information on the first coordinate ($x_P$, $y_P$) and the first depth value ($z_P$) in connection with the point (P). Thus the computer can obtain the first coordinate ($x_P$, $y_P$) and the first depth value ($z_P$) by reading the stored information from the memory of the computer.

In the step of obtaining neighboring coordinates and neighboring depth values (Step 102), the method obtains neighboring coordinates ($x_{Sij}$, $y_{Sij}$) and neighboring depth values ($z_{Sij}$) in the three dimensional graphic. The neighboring coordinates correspond to neighboring points ($S_{ij}$) in the screen. The neighboring points ($S_{ij}$) are pixels neighboring to the first pixel. The subscript i is 0, 1 or 2 and the subscript j is 0, 1 or 2. The $S_{00}$ corresponds to an upper left pixel of the first pixel. The $S_{01}$ corresponds to an upper pixel of the first pixel. The $S_{02}$ corresponds to an upper right pixel of the first pixel. The $S_{10}$ corresponds to a left pixel of the first pixel. The $S_{12}$ corresponds to a right pixel of the first pixel. The $S_{20}$ corresponds to a lower left pixel of the first pixel. The $S_{21}$ corresponds to a lower pixel of the first pixel. The $S_{22}$ corresponds to a lower right pixel of the first pixel. The computer can obtain neighboring coordinates ($x_{Sij}$, $y_{Sij}$) and neighboring depth values ($z_{Sij}$) in a similar manner to obtain the first coordinate ($x_P$, $y_P$) and the first depth value ($z_P$).

In the step of calculating Angles of $PS_{ij}$ vectors (Step 103), the method calculates Angle of $PS_{ij}$ vectors. The angle of $PS_{ij}$ vectors may be the directions of the vectors or angles between x axis and each of $PS_{ij}$ vectors. The computer calculates the angle of the $PS_{ij}$ vector by reading the coordinates of P and $S_{ij}$ and subtracting these coordinates. The method may calculate Angles of the $PS_{ij}$ for all of the pixels in the screen. The method may calculate the one or more angles selected from the group of Angles of $S_{00}PS_{22}$, $S_{01}PS_{21}$, $S_{02}PS_{20}$ and $S_{10}PS_{12}$.

In the step of detecting the edge of the object by means of the Angles of the $PS_{ij}$ vectors (Step 104), the method detects the edge of the object by means of the Angles of the $PS_{ij}$ vectors. In other words, the method can decide whether the point P belongs to an edge or not. For example, the computer stores the angles of $PS_{ij}$ vectors. First the computer reads the direction or angle of $PS_{00}$ and $PS_{22}$ from its memory. Next the computer calculates the angle of $S_{00}PS_{22}$. If $S_{00}PS_{22}$ is the same or close to 180 degrees, the P is not at an edge or a contour. If $S_{00}PS_{22}$ is far different from 180 degrees, then P is estimated to be at an edge or a contour in a vertical direction. Such estimation may be executed by comparing a threshold value with $S_{00}PS_{22}$ by means of the computer. In other words, the method may further comprise a step of deciding whether any combination of the neighboring points correspond to an edge or not. Thus this method can detect the edge or edges of the object.

The second embodiment of the first aspect of the invention calculates $\theta_1$ and $\theta_2$, for the first neighboring point and the second neighboring point. The first and the second neighboring points may be selected from the neighboring points ($S_{ij}$). The angles $\theta_1$ and $\theta_2$ are the latitude angles defined by any two of the $PS_{ij}$ vectors. For example, $\theta_1$ and $\theta_2$ are the angles of $PS_{01}$ and $PS_{21}$, respectively. Another example of the $\theta_1$ and $\theta_2$ are the angles of $PS_{10}$ and $PS_{12}$, respectively. It is preferred that the first neighboring point and the second neighboring point are in an opposite direction of the first point P. The method decides the point P belongs to an edge when $\Theta_R$ is positive. The $\Theta_R$ is equal to $1/2(\cos\theta_1 + \cos\theta_2) - 1$. The computer may calculate the value of $1/2(\cos\theta_1 + \cos\theta_2) - 1$ or obtain the value from a lookup table using the input values of $\theta_1$ and $\theta_2$. Then the computer may decide whether $\Theta_R$ is positive or not. $\Theta$ is a large theta.

The third embodiment of the first aspect of the invention calculates $\theta_1$ and $\theta_2$, for the first neighboring point and the second neighboring point. The method decides the point P belongs to an edge when $\Theta_V$ is positive. $\Theta_V$ is equal to $-1/2(\cos\theta_1 + \cos\theta_2) - 1$. The computer may calculate the value of $-1/2(\cos\theta_1 + \cos\theta_2) - 1$ or obtain the value from a lookup table using the input values of $\theta_1$ and $\theta_2$. Then the computer may decide whether $\Theta_V$ is positive or not.

The fourth embodiment of the first aspect of the invention calculates $(PS_{ij})_z / \|PS_{ij}\|$. $(PS_{ij})_z$ is the difference of depth values between the first depth value ($z_P$) and the neighboring depth value ($z_{Sij}$). $\|PS_{ij}\|$ is the norm value of the $PS_{ij}$ vectors. The computer obtains the first depth value ($z_P$) and the neighboring depth value ($z_{Sij}$) from its memory and calculates $(PS_{ij})_z$ and $\|PS_{ij}\|$. The method decides the point P belongs to an edge when $\Psi_R(P)$ is positive. $\Psi_R(P)$ is equal to $-4 + 1/2\Sigma(PS_{ij})_z/\|PS_{ij}\|)$ $-4 + 1/2(\Sigma(BiasR + (PS_{ij})_z/\|PS_{ij}\|)$. BiasR is a first predetermined number. User may input the BiasR. When the computer obtains a request regarding BiasR, the computer may store the BiasR in its memory. $\Sigma$ is a mathematical formula that represents to sum. The fourth embodiment may use one of $-4 + 1/2(\Sigma(PS_{ij})_z/\|PS_{ij}\|)$ and $-4 + 1/2(\Sigma(BiasR + (PS_{ij})_z/\|PS_{ij}\|)$. The computer can calculate $-4 + 1/2(\Sigma(PS_{ij})_z/\|PS_{ij}\|)$ or $-4 + 1/2(\Sigma(BiasR + (PS_{ij})_z/\|PS_{ij}\|)$ after calculating $(PS_{ij})_z/\|PS_{ij}\|$. Then the computer may decide whether the calculated value is positive or not.

The fifth embodiment of the first aspect of the invention calculates $(PS_{ij})_z/\|PS_{ij}\|$ in a similar way to the fourth embodiment. The method decides the point P belongs to an edge when $\Psi_V(P)$ is positive. $\Psi_V(P)$ is equal to $-4 + 1/2(\Sigma - (PS_{ij})_z/\|PS_{ij}\|)$ or $-4 + 1/2(\Sigma(BiasV - (PS_{ij})_z/\|PS_{ij}\|)$. BiasV is a second predetermined number. The computer can calculate $-4 + 1/2(\Sigma - (PS_{ij})_z/\|PS_{ij}\|)$ or $-4 + 1/2(\Sigma(BiasV - (PS_{ij})_z/\|PS_{ij}\|)$ after calculating $\|PS_{ij}\|$. Then the computer may decide whether the calculated value is positive or not.

The seventh embodiment of the first aspect of the invention calculates $(PS_{ij})_z/\|PS_{ij}\|$ in a similar way to the fourth embodiment. The method decides the point P belongs to an edge when $\Psi_R(P)$ is positive and $|PS_{ij}\|$ is lower or equal to a third predetermined number.

The second aspect of the invention relates to a computer for detecting an edge of an object in a two dimensional image resulting from rendering the plurality of three dimensional objects in a computer graphic.

Figure 2:
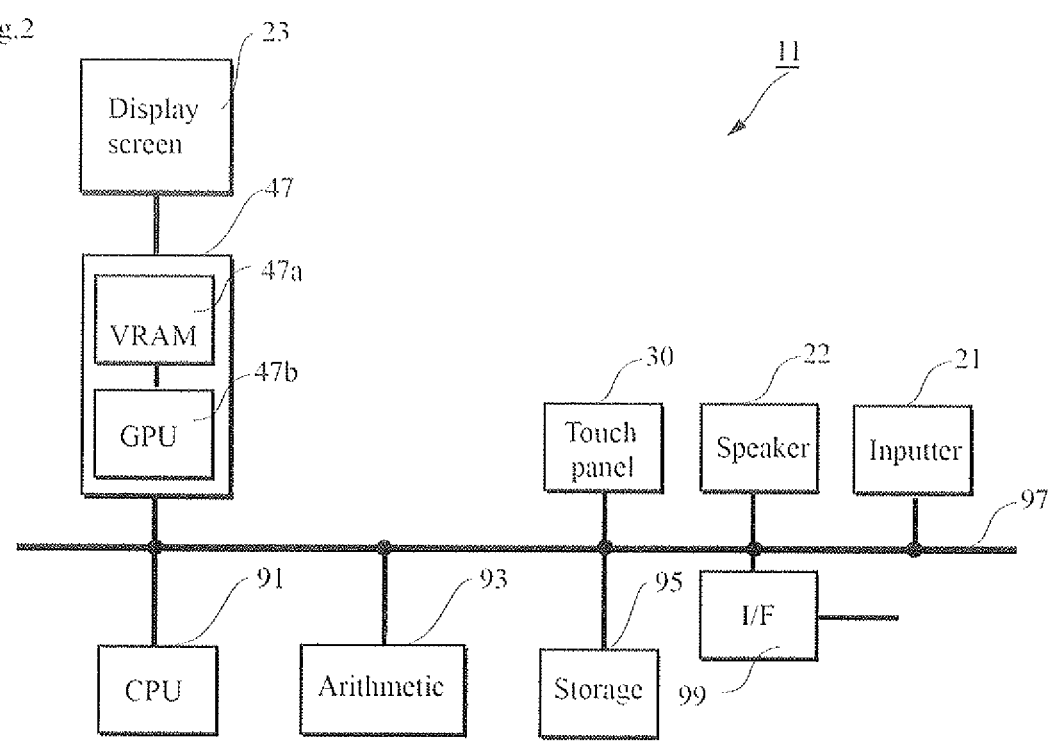
FIG. 2 is a block diagram of a computer according to an embodiment of the present invention.

FIG. 2 is a block diagram of a computer according to an embodiment of the present invention. One example of the computer is a game apparatus. The computer 11 comprises an inputter or an input device 21, a speaker 22, a touch panel 30, a CPU 91, an arithmetic part 93 and a storage part 95. The respective components are connected via a bus 97 for transmission/reception of information. Examples of the inputter 21 are operation buttons, a start switch, a selection switch, and a key board. The computer 11 comprises a display screen 23. The display screen 23 is connected to the bus 97 via a display drive circuit 47. The computer 11 may comprise the touch panel 30 on the display screen 23. The CPU 91 of this computer 11 is connected to an external interface 99 via the bus 97. An example of the external interface 99 is a slot into which a game card or other media may be inserted. The display drive circuit 47 comprises a graphics processing unit (GPU) 47b and a video RAM (VRAM) 47a. The GPU 47b and the VRAM 47a are connected for transmission/reception of information.

Figure 3:
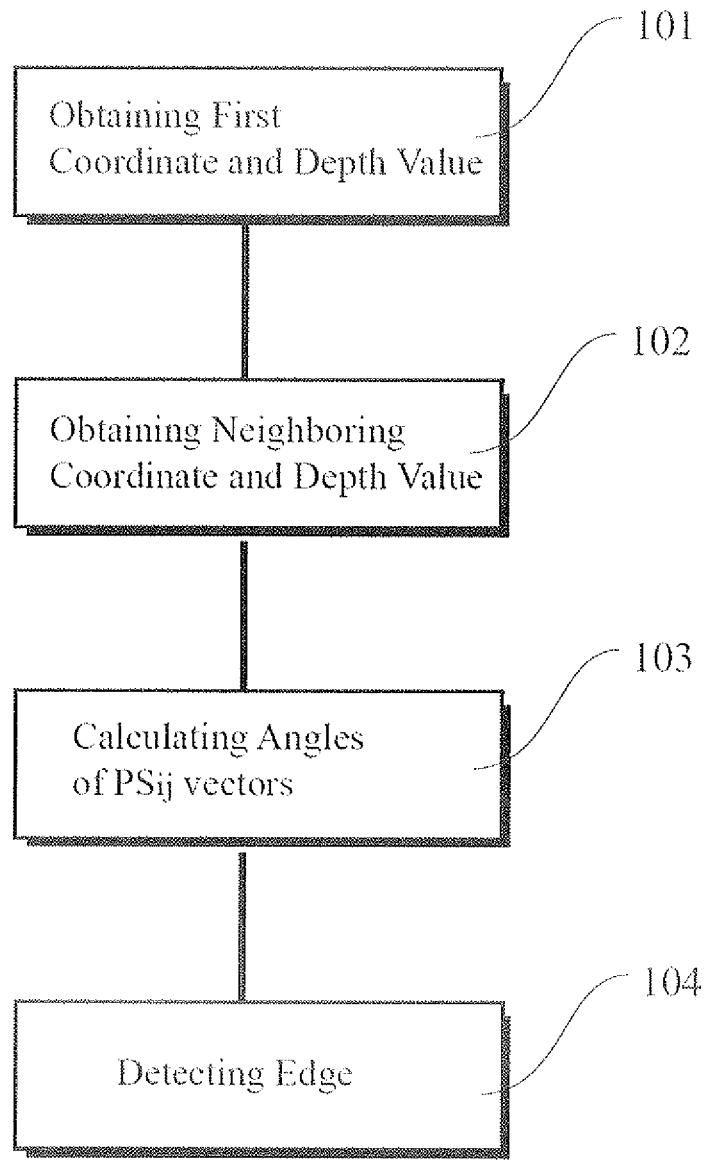
FIG. 3 is a block diagram of the computer.

FIG. 3 is a block diagram of the computer. As shown in FIG. 3, the computer has means for obtaining a first coordinate and a first depth value 101, obtaining neighboring coordinates and neighboring depth values 102, calculating Angles of $PS_{ij}$ vectors 103, and detecting the edge of the object by means of the Angles of the $PS_{ij}$ vectors 104. The present invention may be implemented as a hardware resource, such as a circuit. However, the present invention may be implemented as a hardware resource and software which can make a computer to execute the above method. The present invention further provides software which can make a computer to execute the above method or which makes a computer work as the computer of the second aspect of the invention. The present invention further provides a computer readable medium, such as CD-ROM, that stores the software.

The computer fundamentally implements the above described methods. The computer may have other elements that a conventional computer has. The computer of the second aspect has a means for obtaining a first coordinate ($x_P$, $y_P$) and a first depth value ($z_P$) in the three dimensional graphic that correspond to a point (P) at a first pixel in a screen. The computer has a means for obtaining neighboring coordinates ($x_{Sij}$, $y_{Sij}$) and neighboring depth values ($z_{Sij}$) in the three dimensional graphic that correspond to neighboring points ($S_{ij}$) in the screen, wherein the neighboring points ($S_{ij}$) are pixels neighboring to the first pixel. The computer has a means for calculating Angles of $PS_{ij}$ vectors. The computer has a means for detecting edge of the object by means of the Angles of the $PS_{ij}$ vectors.

We explain the detailed concept of the invention with working Examples below.

Framework

Let us consider two planes Π1 and Π2. Instead of trying to detect an eventual edge between Π1 and Π2, let us describe by means of hemisphere the case when there is no edge between them, i.e. Π1 and Π2 are collinear. Π1 and Π2 are defined as follows. Given a point P and two normalized directions PS1 and PS2, Π1 and Π2 are defined. Then, if Π1 and Π2 are coplanar and either an hemisphere is defined in the case the directions PS1 and PS2 are opposite or an entire unit sphere (modulo 2π).

In other word, one may say that if Π1 and Π2 are not coplanar, then an edge exist. This can be express as follows. Recalling the definition of the surface of a sphere is coming from the integration over the latitude angle θ:

$$S = \int_0^\pi 2\pi r^2 \sin\theta \, d\theta$$

One can express the above remark as follows. Let Θ be a surface element defined as follows:

$$\Theta_R(\theta_1, \theta_2) = \int_{\theta_1}^{\theta_2 + \pi} 2\pi r^2 \sin\theta \, d\theta - \int_0^\pi 2\pi r^2 \sin\theta \, d\theta$$

Where $\theta_1$ and $\theta_2$ are the latitude angles defined by PS1 and PS2. This integral difference can be analytically expressed as $$\Theta_R(\theta_1, \theta_2) = 2\pi r^2 [-\cos\theta]_{\theta_1}^{\theta_2 + \pi} - 2\pi r^2 [-\cos\theta]_0^\pi + Cte$$

which becomes after simplification:

$$\Theta_R(\theta_1, \theta_2) = \frac{1}{2}(\cos\theta_1 + \cos\theta_2) - 1 \quad \text{(Eq. 1)}$$

Then, looking at the surface element Θ value is sufficient to indicate whether an edge exists. Eq. 1 assumes integration from $\theta_1$ and $\theta_2$, but in sack of completeness, one should also consider the integration from $\theta_1$ to $\theta_2$, resulting in:

$$\Theta_V(\theta_1, \theta_2) = -\frac{1}{2}(\cos\theta_1 + \cos\theta_2) - 1 \quad \text{(Eq. 1)}$$

In other words, as a summary, one can interpret Eqs. 1 as follows. An edge is defined if the surface element Θ minus the entire unit sphere surface is greater than zero. If $\Theta_R$ is positive (respectively $\Theta_V$) then the defined edge is a ridge (respectively a valley).

The Cte constant value resulting from the integration is ignored at this point, but as it will be shown in a later section, it may be used as a threshold.

Framework Application

Figure 4:
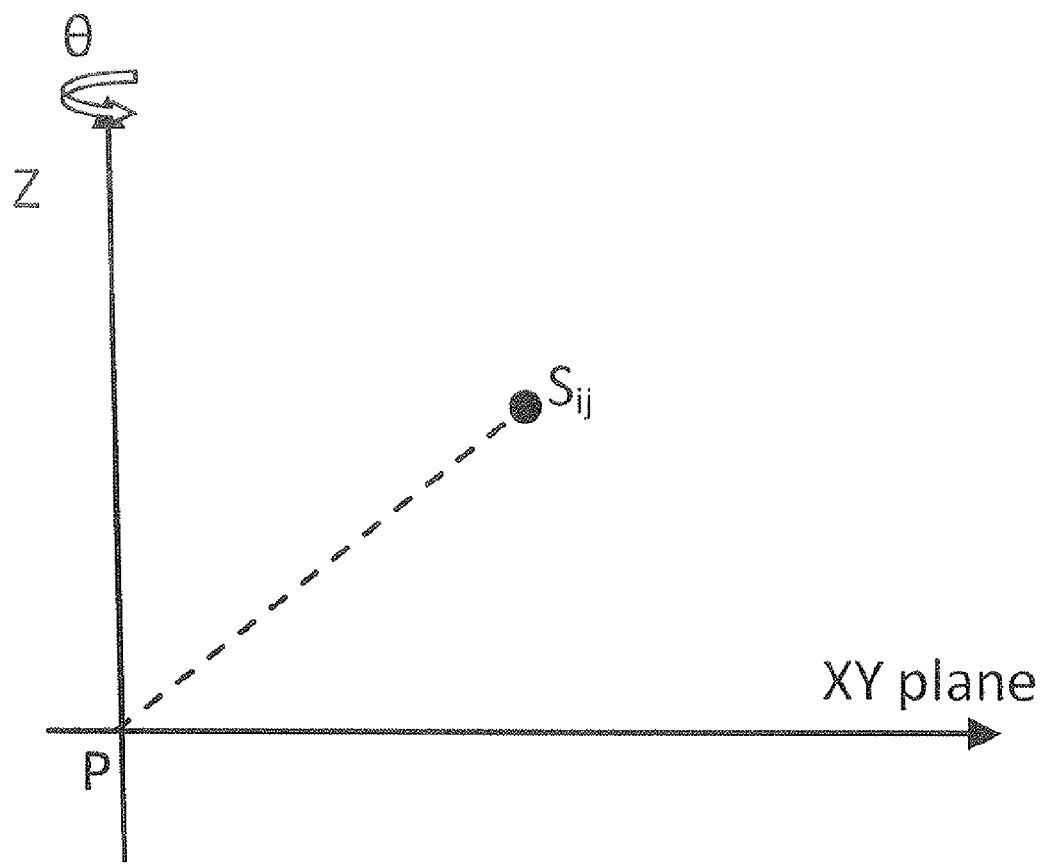
FIG. 4 is visual representation of used notations.

Let us consider that a world position buffer is available. Then, for each fragment, we consider the following neighborhood:

| | | |
|---|---|---|
| $S_{00}$ | $S_{01}$ | $S_{02}$ |
| $S_{10}$ | P | $S_{12}$ |
| $S_{20}$ | $S_{21}$ | $S_{22}$ |

Where P is the current point position and the S are the neighboring positions. Visual representation for a given is given in FIG. 4.

For every $S_{ij}$, the corresponding $\theta_{ij}$ angles can be defined as:

$$\theta_{ij} = \tan^{-1}\left(\frac{P_z - S_{ij_z}}{\sqrt{(P_x - S_{ij_x})^2 + (P_y - S_{ij_y})^2}}\right)$$

In order to obtain a robust edge detection, the 8 $\theta_{ij}$ has to be calculated and each opposite pair is used in Eq 1, that is $\Theta(\theta_{00}, \theta_{22})$, $\Theta(\theta_{01}, \theta_{21})$, $\Theta(\theta_{02}, \theta_{20})$ and $\Theta(\theta_{10}, \theta_{12})$, resulting in:

$$\psi(P) = \frac{1}{2}\sum \cos\theta_{ij} - 4$$

Calculation of the arc tangent and cosine terms are redundant and can be simplified. If the $PS_{ij}$ vectors are normalized, then trivially, the cosine of the $\theta_{ij}$ angles is defined as:

$$\cos\theta_{ij} = \frac{(PS_{ij})_z}{\|PS_{ij}\|}$$

According to the framework explained in the framework section, to detect the presence of an edge, one should consider both directions while integrating the surface element, resulting in the following:

$$\begin{cases} \psi_R(P) = -4 + \frac{1}{2}\sum \frac{(PS_{ij})_z}{\|PS_{ij}\|} \\ \psi_V(P) = -4 + \frac{1}{2}\sum \frac{-(PS_{ij})_z}{\|PS_{ij}\|} \end{cases}$$

Figure 5A:
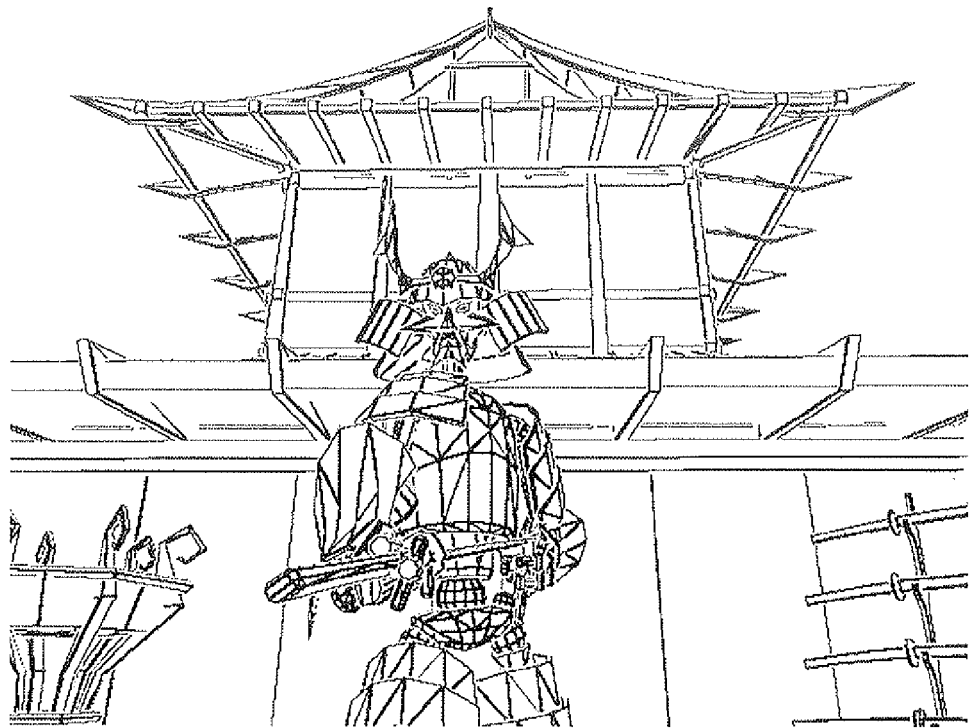
FIG. 5A shows the result of the proposed edge detection, corresponding to positive $\psi_R$.
Figure 5B:
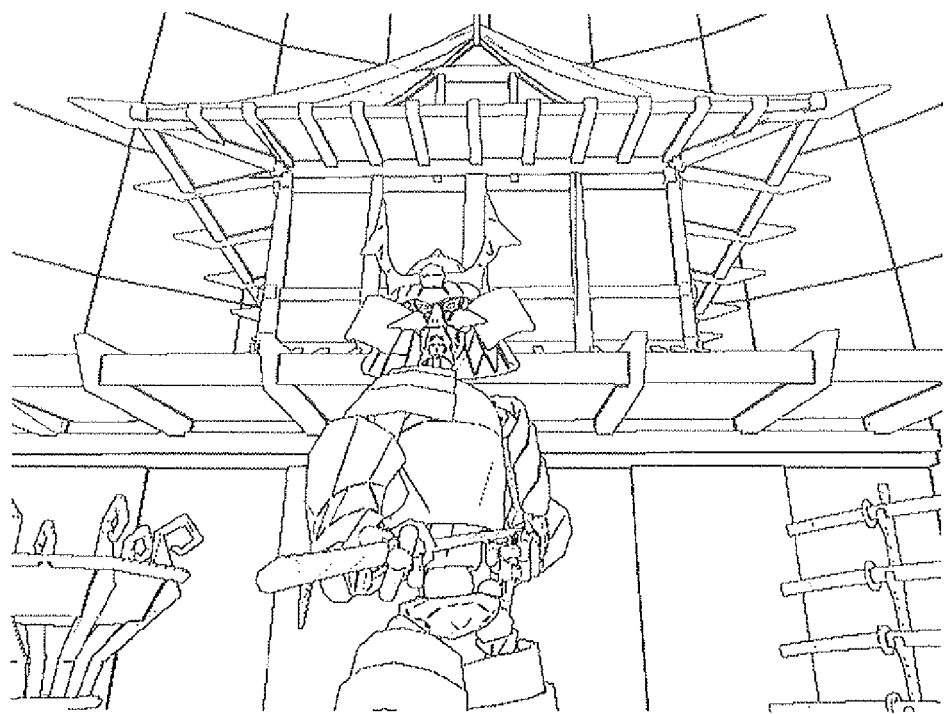
FIG. 5B shows the result of the proposed edge detection, corresponding to positive $\psi_V$.

FIGS. 5A and 5B show the result of the proposed edge detection, corresponding respectively to positive $\psi_R$ and positive $\psi_V$. As one can see, all the edges are detected. In fact, too many edges are detected. The samurai armor or the background clearly show edges between the triangles/quadrangles when not planar.

This can be easily overcome while using a simple threshold. The constant value Cte resulting from the integral given in the framework section and omitted in Eq. 1 can be used to define a bias in the edge detection, removing edges below a certain crease angle.

$$\begin{cases} \psi_R(P) = -4 + \frac{1}{2}\sum BiasR + \frac{(PS_{ij})_z}{\|PS_{ij}\|} \\ \psi_V(P) = -4 + \frac{1}{2}\sum BiasV + \frac{-(PS_{ij})_z}{\|PS_{ij}\|} \end{cases}$$

Figure 6A:
FIG. 6A shows the influence of the bias for ridges.
Figure 6B:
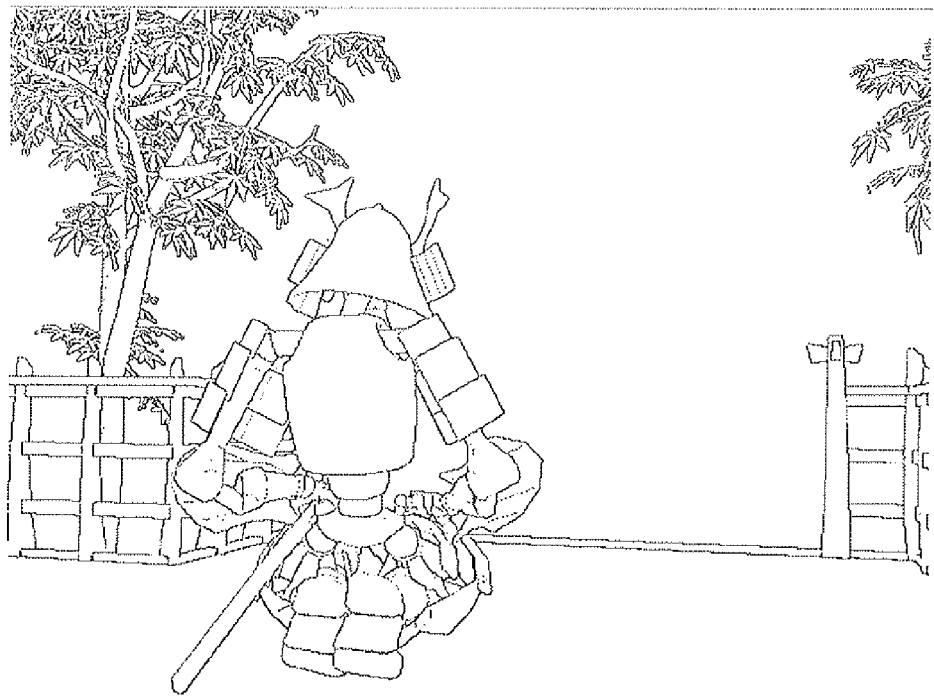
FIG. 6B shows the influence of the bias for ridges.

FIGS. 6A and 6B show the influence of the bias for ridges. As one can see ridges defined as an angle below a certain threshold can be removed.

Distance

Figure 7A:
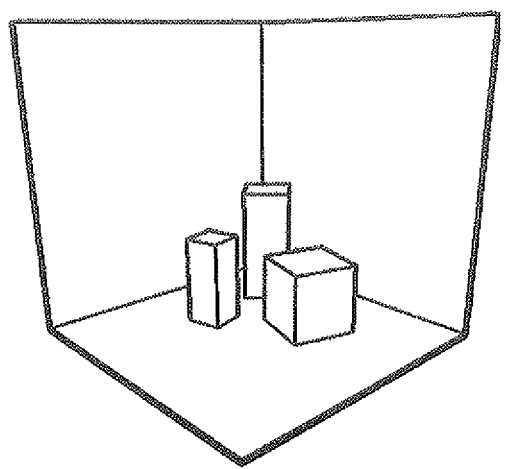
FIG. 7A shows the edges detected using $\psi_R$ and $\psi_V$.
Figure 7B:
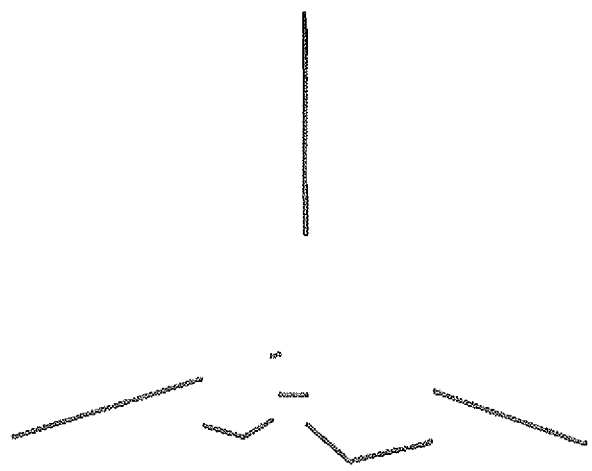
FIG. 7B shows edges resulting from $\psi_R$, where the depth changes are lower than a threshold.

In addition to ridges and valleys, a desirable knowledge about edge is when a ridge is detected, to be able to tell if it occurs because of a large difference in depth or an abrupt change in the surface direction as shown in FIG. 7. FIG. 7A shows the edges detected using $\psi_R$ and $\psi_V$. FIG. 7B shows edges resulting from $y_R$, where the depth changes are lower than a threshold.

Detection of such difference in edges is easily described as follows. Given a radius R, we define $\psi_1$) as:

$$\psi_D = \begin{cases} \psi_R & \text{if } d^2 < R \\ 0 & \text{otherwise} \end{cases}$$

Figure 8A:
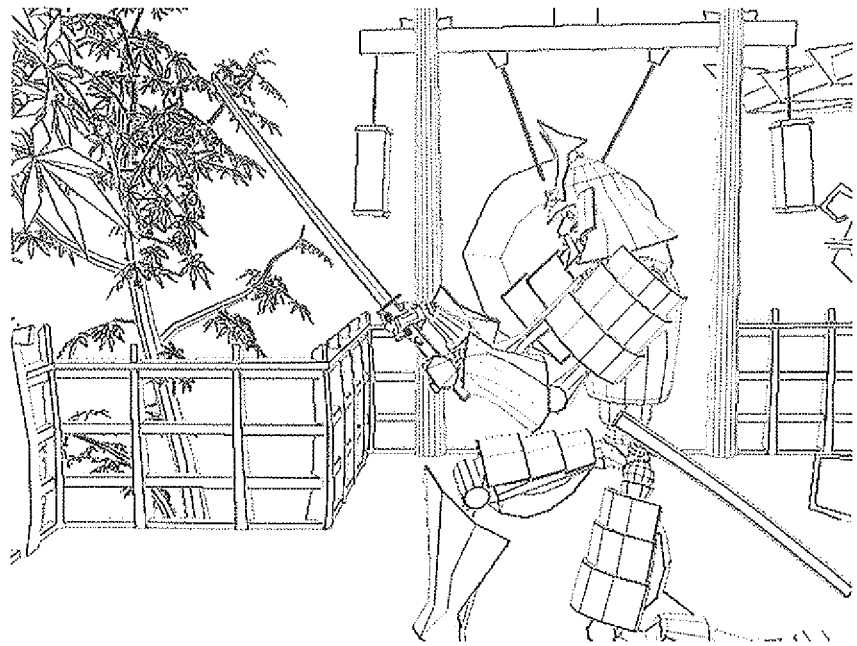
FIG. 8A shows $\psi_R$ and $\psi_V$.
Figure 8B:
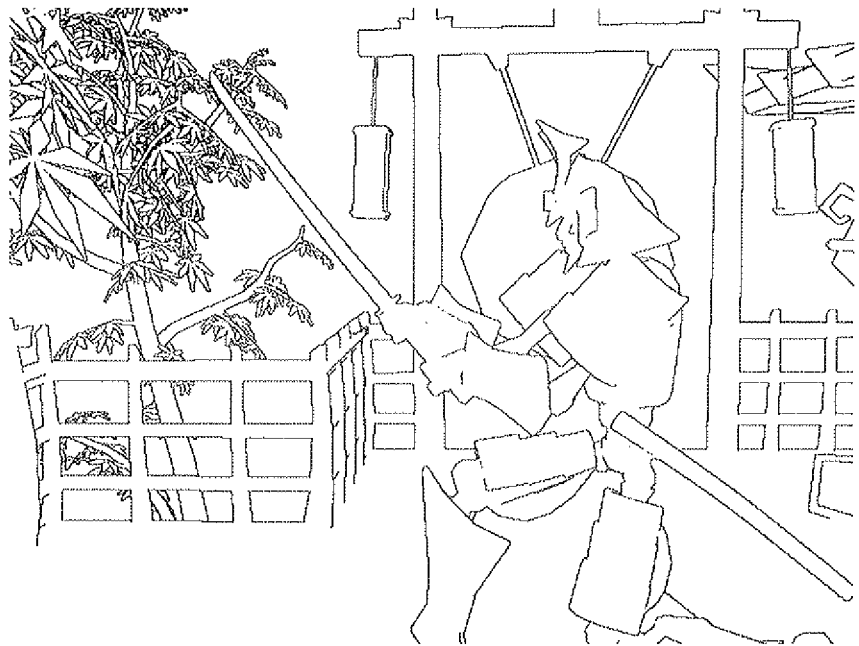
FIG. 8B shows the corresponding silhouette, where it is defined as $\psi_R$-$\psi_D$.

Using this simple distance based threshold, differences between edges can be made. This is of particular importance in image based effects using edges such as ambient occlusion or contour silhouette detection as in shown in FIGS. 8A and 8B. FIG. 8A shows $\psi_R$ and $\psi_V$ and FIG. 8B shows the corresponding silhouette, where it is defined as $\psi_R - \psi_D$.

Implementation

FIG. 9 provides an algorithm reflecting a possible software implementation for the described edge detection method.

The function GetPsyValues, shown in FIG. 9, using the input position P and one of the Sij, corresponds to the following equation.

$$\begin{cases} \gamma_R(P) = BiasR + \frac{(PS_{ij})_z}{\|PS_{ij}\|} \\ \gamma_V(P) = BiasV - \frac{(PS_{ij})_z}{\|PS_{ij}\|} \\ \gamma_D = \begin{cases} \gamma_R & \text{if } d^2 < R \\ 0 & \text{otherwise} \end{cases} \end{cases}$$

The function GetEdge, shown in FIG. 9, using the discrete input coordinate i, j, obtains the corresponding position P and 9 Sij while reading external memory using the function read-Position Buffer, and computes for each pair of Sij using the function GetPsyValues the 4 Psy values, each PsyValue corresponding to the following equation.

$$\begin{cases} \psi_R(P) = -1 + \frac{1}{2}(\gamma_{R0}(P) + \gamma_{R1}(P)) \\ \psi_V(P) = -1 + \frac{1}{2}(\gamma_{V0}(P) + \gamma_{V1}(P)) \\ \psi_D(P) = -1 + \frac{1}{2}(\gamma_{D0}(P) + \gamma_{D1}(P)) \end{cases}$$

The 4 Psy values are then added together, providing the edge definition given in this pamphlet.

Discussion

Degradation of the proposed edge detection filter is discussed hereafter. Instead of considering the complete filter comprising in total four pairs of Sij neighbor values, subsets, two or three pairs of values may be considered. FIGS. 10A, 10B and 11A, 11B show a comparison between different Sij subsets selected as follows.

| $S_{00}$ | — | $S_{02}$ |
| --- | --- | --- |
| — | P | — |
| $S_{20}$ | — | $S_{22}$ |

| — | $S_{01}$ | — |
| --- | --- | --- |
| $S_{10}$ | P | $S_{12}$ |
| — | $S_{21}$ | — |

| $S_{00}$ | $S_{01}$ | $S_{02}$ |
| --- | --- | --- |
| — | — | — |
| — | $S_{21}$ | $S_{22}$ |

| $S_{00}$ | $S_{01}$ | $S_{02}$ |
| --- | --- | --- |
| — | P | — |
| $S_{20}$ | $S_{21}$ | $S_{22}$ |

| $S_{00}$ | $S_{01}$ | $S_{02}$ |
| --- | --- | --- |
| $S_{10}$ | P | $S_{12}$ |
| $S_{20}$ | $S_{21}$ | $S_{22}$ |

Figure 10A:
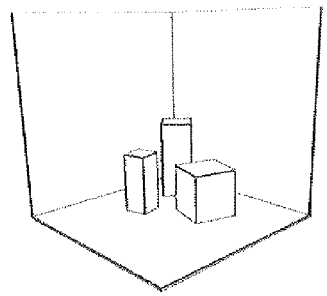
FIG. 10A is a result that shows degradation of edge detections algorithm applied to a scene composed of boxes.
Figure 10B:
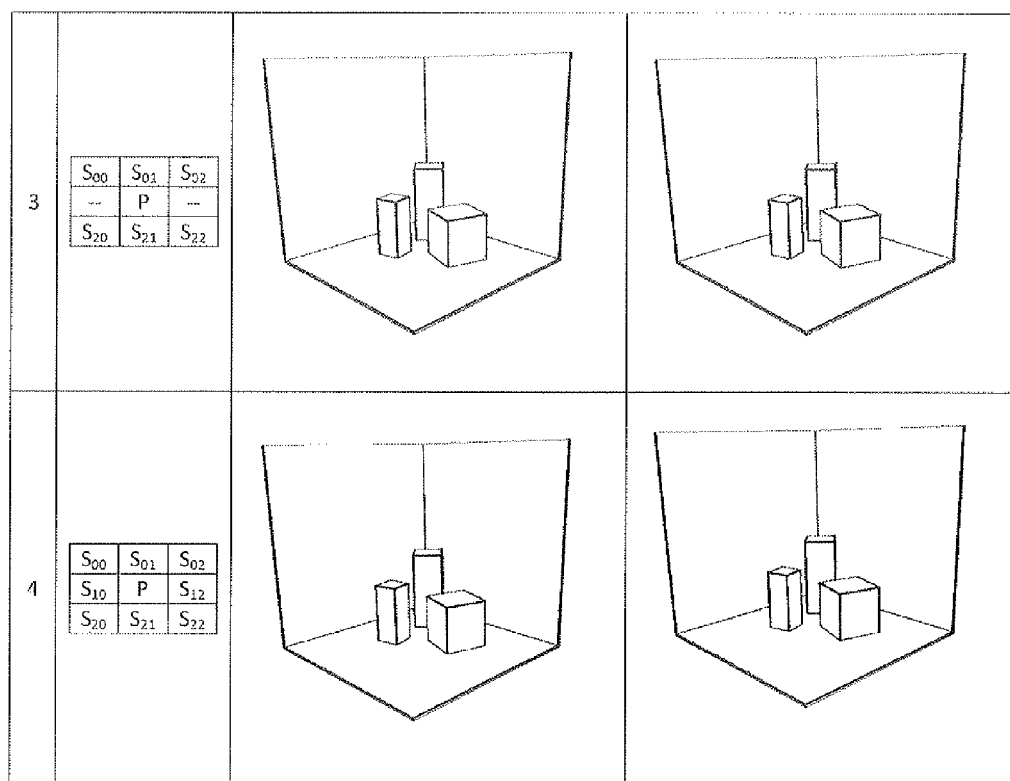
FIG. 10B is a result that shows degradation of edge detections algorithm applied to a scene composed of boxes.
Figure 11A:
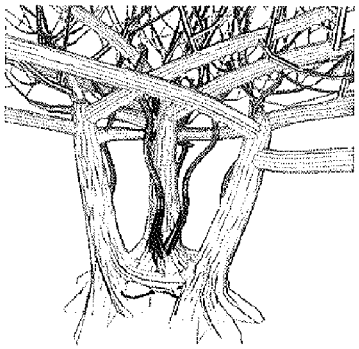
FIG. 11A is a result that shows degradation of edge detections algorithm applied to tree model.
Figure 11B:
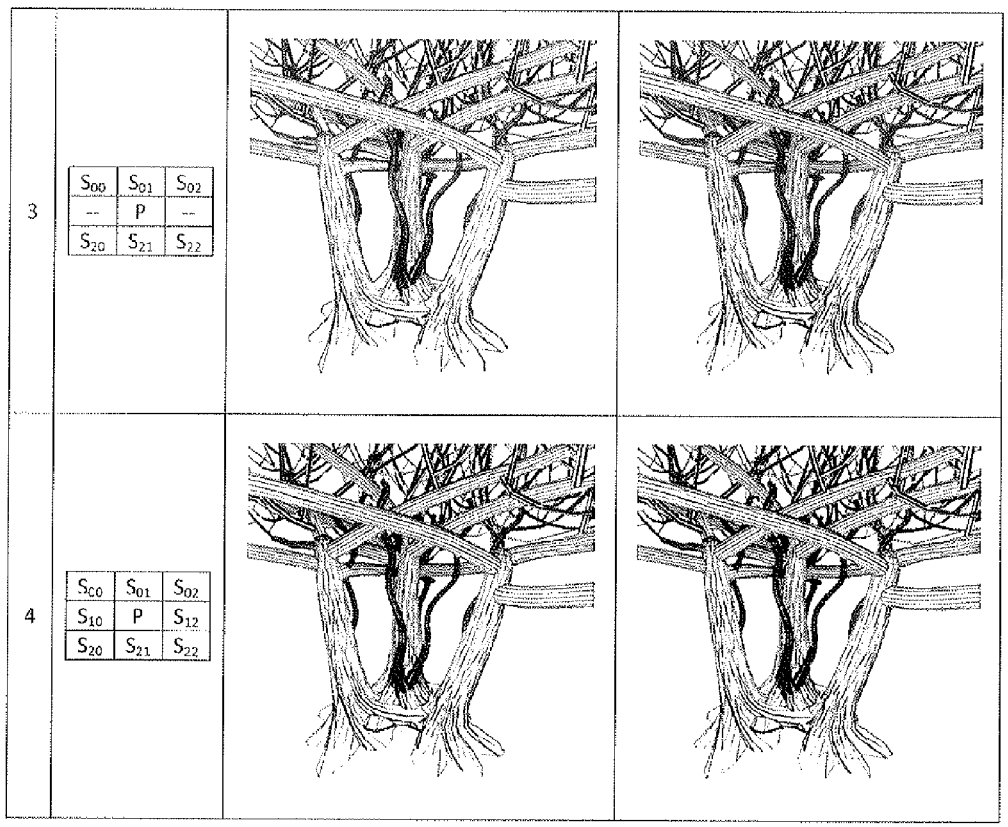
FIG. 11B is a result that shows degradation of edge detections algorithm applied to tree model.

For the scene composed of boxes, choosing diagonal orientations ($S_{00}$ $S_{02}$ $S_{20}$ $S_{22}$) gives better results than other subset and is very similar to the results obtained while using the 8 angles. FIGS. 10A and 10B are results that show degradation of edge detections algorithm applied to the scene composed of boxes. Axis aligned subset depicts several artifacts and not clear edges. On the other hand, for the tree example, either axis aligned or diagonal orientations using 2 pairs of Sij gives equivalent result duality-wise. FIGS. 11A and 1113 are results that show degradation of edge detections algorithm applied to tree model.

Although not shown here, in case of animated scenes, such as non-rigid deformations or camera motions, edges smoothly appear and disappear, thanks to the trigonometric framework of the proposed invention.

Block Diagram Outline

In the following section, we propose various block diagrams describing the proposed approach. As an overview, the edge detection algorithm can be summarized as disclosed in FIG. 1.

Figure 12:
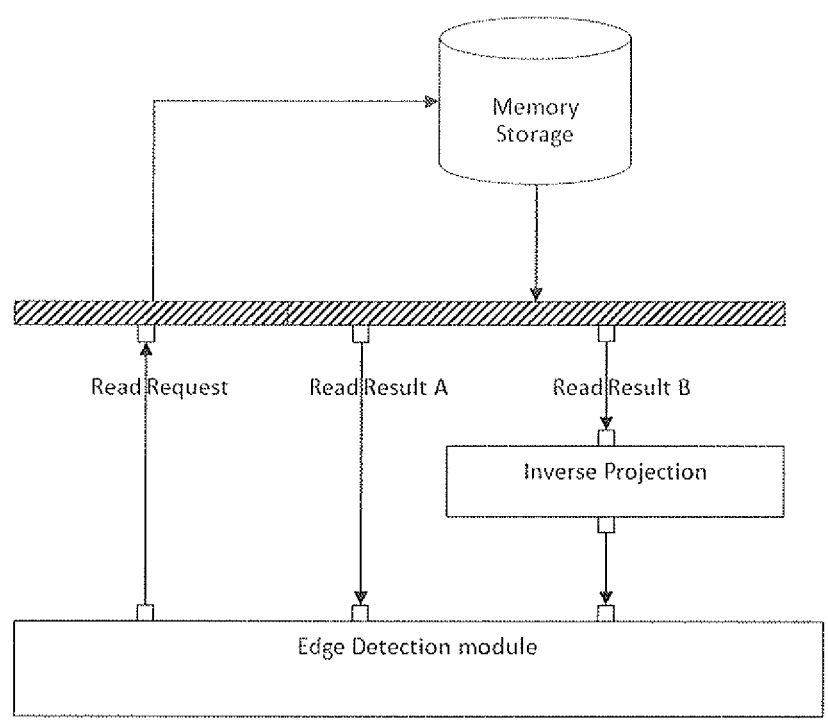
FIG. 12 is a block diagram of the system with programmable shader
Figure 13:
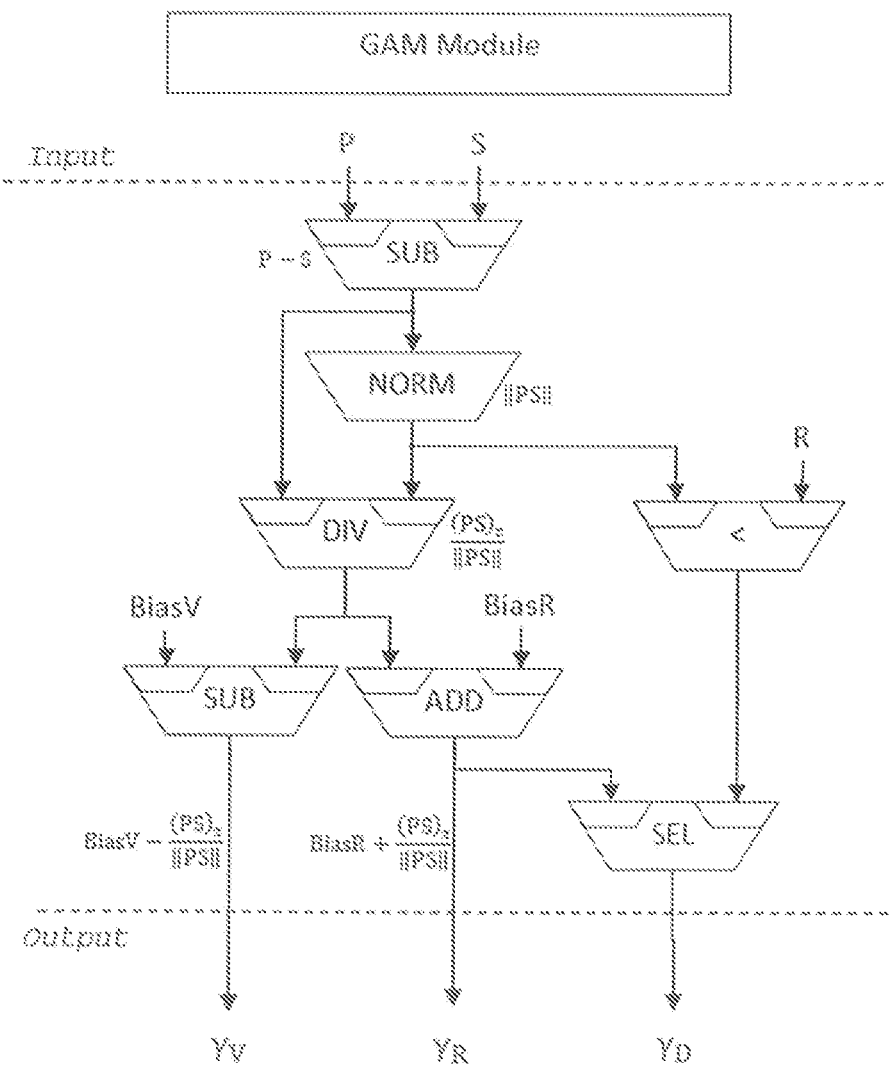
FIG. 13 is an atomic module.

The Position storage may be stored in memory, and contains for every discrete element of the memory either a single value representing depth or a vector representing a real world coordinates. Typically, the first case where a single depth valve refers to technologies with or without programmable shaders (i.e. standard depth buffer) while the second case exclusively address technologies with programmable shader facility. In the later case, as shown in FIG. 12, a read request is issued from the edge detection module and result (result A in the figure) is directly consumed by the edge detection module. In the case only depth buffer is used, the data obtained by the read request is first consumed by an inverse projection module and then consumed by the edge detection module. Typically, the inverse projection module consists in a 4×4 vector matrix multiplication.

For every point position P, nine reading requests are issued from the edge detection module. In the case inverse projection is required, one may notice that as the edge detection algorithm calculation is localized within a 3×3 pixel windows centered around the pixel under interest, it is sufficient to have a small 3×width line cache to store the transformed coordinates in order to avoid redundant transformation. While providing this line cache facility, inverse projection circuit may be of single occurrence. Otherwise, 9 instances of this module may be required to obtain high performances.

Assuming at this stage that world position is available by some means, the edge detection algorithm can be described as follows. Recalling the following:

| $S_{00}$ | $S_{01}$ | $S_{02}$ |
|---|---|---|
| $S_{10}$ | P | $S_{12}$ |
| $S_{20}$ | $S_{21}$ | $S_{22}$ |

One can say that the atomic calculation takes 3 input, the center P and 2 opposite $S_{ij}$ values (P, $S_{00}$ and $S_{22}$ for instance). Let us define this atomic module as disclosed in FIG. 3 referred hereafter as GAM module.

The GAM module corresponds to the following equation:

$$\begin{cases} \gamma_R(P) = BiasR + \dfrac{(PS_{ij})_z}{\|PS_{ij}\|} \\ \gamma_V(P) = BiasV - \dfrac{(PS_{ij})_z}{\|PS_{ij}\|} \\ \gamma_D = \begin{cases} \gamma_R & \text{if } d^2 < R \\ 0 & \text{otherwise} \end{cases} \end{cases}$$

Figure 14:
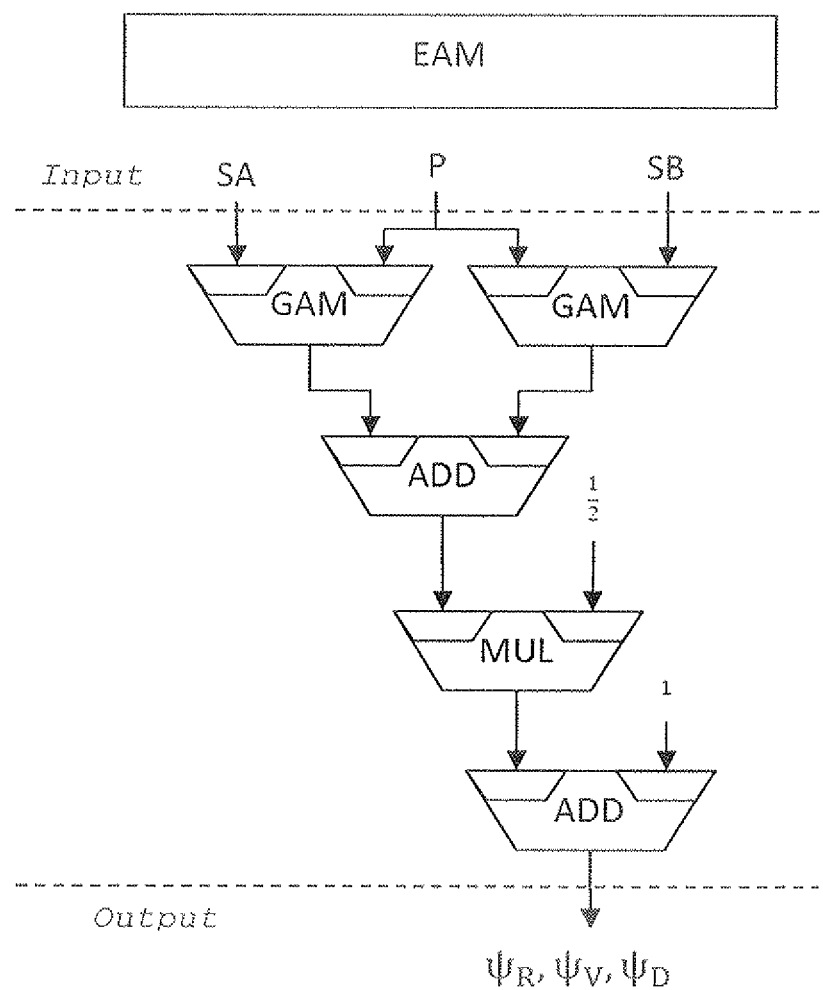
FIG. 14 is a system with an EAM module.

Combining two GAM modules together with the help of two adders and one multiplier defines the EAM module, shown in FIG. 14, and corresponding to the following equations:

$$\begin{cases} \psi_R(P) = -1 + \dfrac{1}{2}(\gamma_{R0}(P) + \gamma_{R1}(P)) \\ \psi_V(P) = -1 + \dfrac{1}{2}(\gamma_{V0}(P) + \gamma_{V1}(P)) \\ \psi_D(P) = -1 + \dfrac{1}{2}(\gamma_{D0}(P) + \gamma_{D1}(P)) \end{cases}$$

Referring to the discussion session of this document, an embodiment may focus on higher quality, another on speed, yet another on gate size. Higher quality and best performance may be obtained while providing 4 different instances of the EAM module as depicts FIG. 15.

Figure 15:
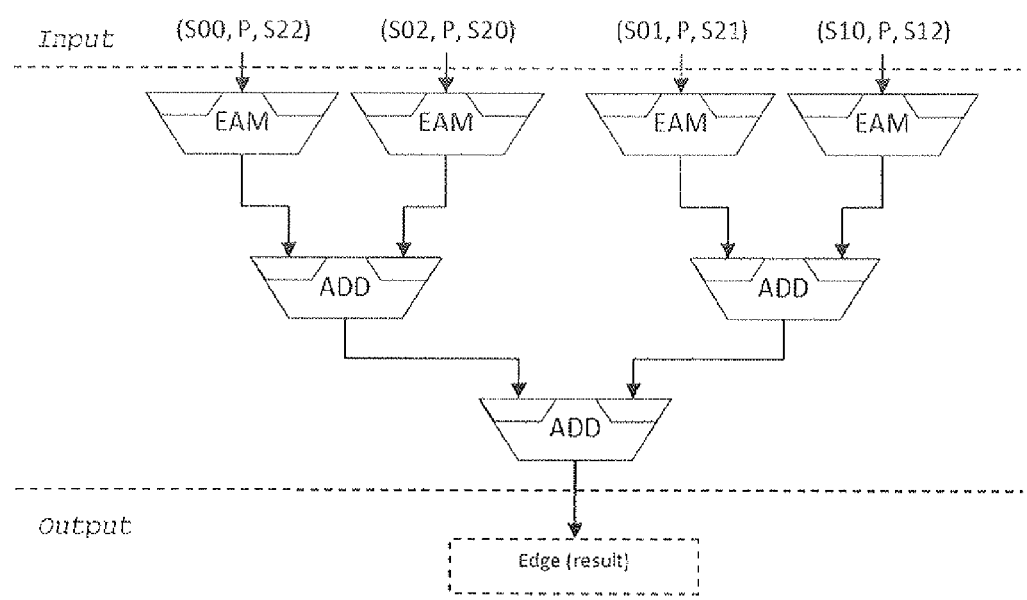
FIG. 15 is a system with an EAM module.

This module shown in FIG. 15 with performance can be degraded while removing 1 pair of the EAM module, resulting in the embodiment where smaller hardware circuit is preferred. In that case, similar result as high quality can be obtained while providing a multicycle approach (the 2 EAM modules are used 2 times per fragment result in 2 cycles per fragment), or lower (but sufficient) quality can be obtained in a single cycle while using 2 major directions (see the discussion section).

In the same spirit, a single LAM module can be used if the preferred embodiment aims smallest gate size. In such case, at least 2 cycles per input are required for lower quality, 4 for highest quality.

Similar regression is possible for the LAM module, where one or two instances of the GAM module may be used.

[INDUSTRIAL APPLICABILITY]

This invention is used, e.g., in computer graphics industry and amusement industry.

[REFERENCE SIGNS LIST]

11 a computer;
21 an input device; 22 a speaker;
30 a touch panel;
47 a display drive circuit; 47a a video RAM (VRAM); 47b a graphics processing unit (GPU);
91a CPU; 93 an arithmetic part; 95 a storage part; 97 a bus; 99 an external interface;
101 means for obtaining a first coordinate and a first depth value;
102 means for obtaining neighboring coordinates and neighboring depth values;
103 means for calculating Angles of PS vectors;
104 means for detecting the edge of the object by means of the Angles of the $PS_{ij}$ vectors

CITATION LIST

Patent Literature

The pamphlet of WO2008/137051

The invention claimed is:

1. A method for detecting an edge of an object in a two dimensional image resulting from rendering a three dimensional object in a three dimensional computer graphic, the method comprising the steps of:

obtaining a first coordinate ($x_p$, $y_p$) and a first depth value ($z_p$) in the three dimensional graphic that correspond to a point (P) at a first pixel in a screen;

obtaining neighboring coordinates ($x_{Sij}$, $y_{Sij}$) and neighboring depth values ($z_{Sij}$) in the three dimensional graphic that correspond to neighboring points ($S_{ij}$) in the screen, wherein the neighboring points ($S_{ij}$) are pixels neighboring to the first pixel, wherein the subscript i is 0, 1 or 2 and the subscript j is 0, 1 or 2;

calculating Angles of $P_{ij}$ vectors;

detecting the edge of the object by means of the Angles of the $PS_{ij}$ vectors, wherein the $S_{00}$ corresponds to an upper left pixel of the first pixel, the $S_{01}$ corresponds to an upper pixel of the first pixel, the $S_{02}$ corresponds to an upper right pixel of the first pixel, the $S_{10}$ corresponds to a left pixel of the first pixel, the $S_{12}$ corresponds to a right pixel of the first pixel, the $S_{20}$ corresponds to a lower left pixel of the first pixel, the $S_{21}$ corresponds to a lower pixel of the first pixel, and the $S_{22}$ corresponds to a lower right pixel of the first pixel.

2. A method in accordance with claim 1, wherein the method calculates Angles of the $PS_{ij}$ vectors for all of the pixels in the screen.

3. A method in accordance with claim 1, wherein the step of calculating Angles of $PS_{ij}$ vectors comprises calculating one or more selected from the group of Angles of $S_{00}PS_{22}$, $S_{01}PS_{21}$, $S_{02}PS_{20}$ and $S_{10}PS_{12}$.

4. A method in accordance with claim 1,
wherein the step of calculating Angles of $PS_{ij}$ vectors comprises a step of calculating $\theta_1$ and $\theta_2$, for a first and a second neighboring points,
wherein the step of detecting the edge of the object decides the point P belongs to an edge when $\Theta_R$ is positive, $\Theta_R$ being equal to $\frac{1}{2}(\cos\theta_1+\cos\theta_2+Alpha1)-1$, wherein the Alpha 1 is the predetermined number.

5. A method in accordance with claim 1,
wherein the step of calculating Angles of $PS_{ij}$ vectors comprises a step of calculating $\theta_1$ and $\theta_2$, for a first and a second neighboring points,
wherein the step of detecting the edge of the object decides the point P belongs to an edge when $\Theta_v$ is positive, $\Theta_v$ being equal to $-\frac{1}{2}(\cos\theta_1+\cos\theta_2+Alpha2)-1$, wherein the Alpha2 is the predetermined number.

6. A method in accordance with claim 1,
wherein the step of calculating Angles of $PS_{ij}$ vectors comprises a step of calculating $(PS_{ij})_z/\|PS_{ij}\|$, wherein $(PS_{ij})_z$ is difference of depth values between the first depth value ($z_P$) and the neighboring depth value ($z_{Sij}$) and $\|PS_{ij}\|$ is the norm value of the $PS_{ij}$ vectors,
wherein the step of detecting the edge of the object decides the point P belongs to an edge when $\Psi_R(P)$ is positive, $\Psi_R(P)$ being equal to $-4+\frac{1}{2}(\Sigma(PS_{ij})_z/\|PS_{ij}\|)$, wherein BiasR is a first predetermined number.

7. A method in accordance with claim 1,
wherein the step of calculating Angles of $PS_{ij}$ vectors comprises a step of calculating $(PS_{ij})_z/\|PS_{ij}\|$, wherein $(PS_{ij})_z$ is difference of depth values between the first depth value ($z_P$) and the neighboring depth value ($z_{Sij}$) and $\|PS_{ij}\|$ is the norm value of the $PS_{ij}$ vectors,
wherein the step of detecting the edge of the object decides the point P belongs to an edge when $\Psi_V(P)$ is positive, $\Psi_V(P)$ being equal to $-4+\frac{1}{2}(\Sigma-(PS_{ij})_z/\|PS_{ij}\|$, wherein BiasV is a second predetermined number.

8. A method in accordance with claim 1,
wherein the step of calculating Angles of $PS_{ij}$ vectors comprises a step of calculating $(PS_{ij})_z/\|PS_{ij}\|$, wherein $(PS_{ij})_z$ is difference of depth values between the first depth value ($z_P$) and the neighboring depth value ($z_{Sij}$) and $\|PS_{ij}\|$ is the norm value of the $PS_{ij}$ vectors,
wherein the step of detecting the edge of the object decides the point P belongs to an edge when $\Psi_R(P)$ is positive and $\|PS_{ij}\|$ is lower or equal to a third predetermined number, $\Psi_R(P)$ being equal to $-4+\frac{1}{2}(\Sigma(PS_{ij})_z/\|PS_{ij}\|)$ wherein BiasR is a first predetermined number.

9. A computer for detecting an edge of an object in a two dimensional image resulting from rendering the plurality of three dimensional objects in a computer graphic, the computer comprising:
means for obtaining a first coordinate ($x_p$, $y_p$) and a first depth value ($z_p$) in the three dimensional graphic that correspond to a point (P) at a first pixel in a screen;
means for obtaining neighboring coordinates ($x_{Sij}$, $y_{Sij}$) and neighboring depth value s ($z_{Sij}$) in the three dimensional graphic that correspond to neighboring points ($S_{ij}$) in the screen, wherein the neighboring points ($S_{ij}$) are pixels neighboring to the first pixel, wherein the subscript i is 0, 1 or 2 and the subscript j is 0, 1 or 2;
means for calculating Angle of $PS_{ij}$ vector;
means for detecting edge of the object by means of the Angle of the $PS_{ij}$ vector,
wherein the $S_{00}$ corresponds to an upper left pixel of the first pixel,
the $S_{01}$ corresponds to an upper pixel of the first pixel,
the $S_{02}$ corresponds to an upper right pixel of the first pixel,
the $S_{10}$ corresponds to a left pixel of the first pixel,
the $S_{12}$ corresponds to a right pixel of the first pixel,
the $S_{20}$ corresponds to a lower left pixel of the first pixel,
the $S_{21}$ corresponds to a lower pixel of the first pixel, and
the $S_{22}$ corresponds to a lower right pixel of the first pixel.

* * * * *